UNITED STATES PATENT OFFICE.

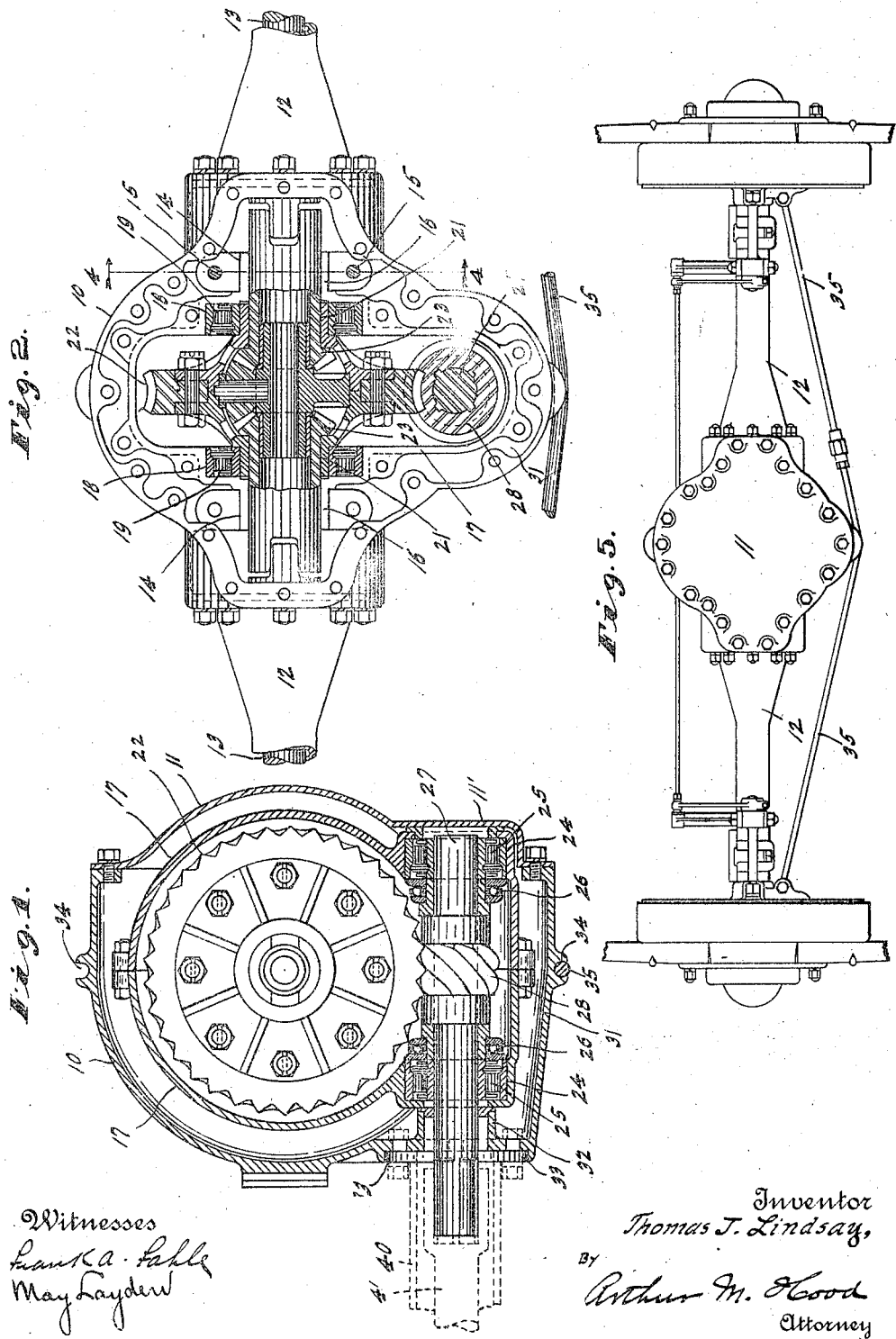

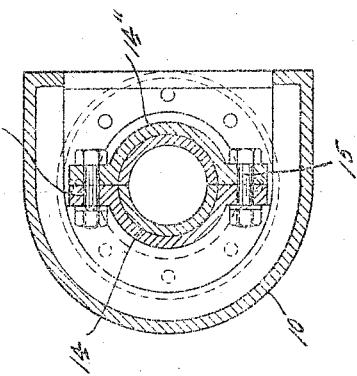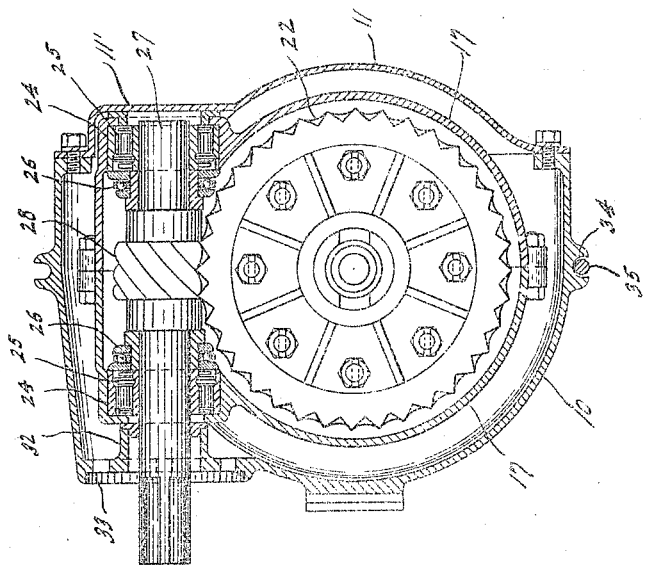

THOMAS J. LINDSAY, OF INDIANAPOLIS, INDIANA.

WORM-DRIVE AXLE STRUCTURE.

1,036,660.  Specification of Letters Patent.  Patented Aug. 27, 1912.

Application filed March 18, 1912. Serial No. 684,575.

*To all whom it may concern:*

Be it known that I, THOMAS J. LINDSAY, a citizen of the United States, residing at Indianapolis, in the county of Marion and State of Indiana, have invented a new and useful Worm-Drive Axle Structure, of which the following is a specification.

The object of my invention is to produce a convenient and economical power transmission unit for driving axle structures for automobiles, comprising a differential gearing or compensator, a driving worm, and an inclosing casing structure, the arrangement being such that the unit may be readily assembled and adjusted on a bench and then embodied in an axle structure with the driving worm arranged either above or below the compensator.

The accompanying drawings illustrate my invention.

Figure 1 is a transverse section of the complete unit; Fig. 2 an elevation, with the cover of the casing removed and the compensator in section, and with fragments of coöperating shaft units in place; Fig. 3 a section similar to Fig. 1 but with the driving worm above the compensator; Fig. 4 a section on line 4—4 of Fig. 2, and Fig. 5 an elevation, on a smaller scale.

In the drawings, 10 indicates a casing member having a readily removable cover 11. This casing 10—11, is formed, at axially opposite portions, so as to receive tubular shaft-carrying units 12, 12 in each of which is rotatably mounted a shaft 13, as fully set forth in my pending application Serial No. 642,799.

In the main body 10 I form two seats or pockets 14, 14 each of which is complemented by a cap 14″ detachably secured in place by bolts 15. The pockets 14, 14 are formed to receive the hubs 16, 16 of a cage which is formed by two mating members 17, 17. Cage 17—17 is provided with two alined bearing pockets 18, 18 in each of which is mounted a roller bearing 19.

The main body of the compensator or differential gearing is formed with two oppositely extending trunnions 21, 21, which are supported by the bearings 19 and the said main body carries a main worm gear 22. The center gears 23, 23 of the differential gearing have a non-rotative, axially and transversely separable, connection with the adjacent ends of the shafts 13.

The two cage members 17, 17 are preferably similar and each is provided with an open-bottom bearing-pocket 24 which are alined and lie at right angles to the axis of the trunnions 21. Each of the pockets 24 receives a roller bearing 25 and arranged against the inner end of each pocket is a thrust bearing 26. Mounted in the bearings 25 and projected through the bearings 26 is a drive shaft 27 and splined upon this shaft, between the thrust bearings 26, is a driving worm 28 which meshes with the worm-wheel 22.

The casing 10 is formed with a transverse pocket 31, into which the pockets 24 of the cage 17 project, and this portion of the cage 17 is held between an inwardly projecting flange 32, of casing 10, and the part 11′ of cover 11. At 33 the casing 10 is formed to receive the rear end of a torque tube 40 which may house a main power shaft 41 connected, by an axially separable joint, with the shaft 27.

Casing 10 is provided, top and bottom, with a crotch 34 for the reception of the usual brace rod 35 the ends of which are to be connected in a suitable manner to points near the outer ends of the units 12, as in the manner shown in my above mentioned application.

In assembling the various parts of my device, worm wheel 22 may be arranged to take the thrust in either direction by merely reversing the cage, end for end, in the casing. The worm 28 may also be readily reversed on shaft 27.

If an under drive is desired the casing 10 will be arranged as shown in Fig. 1, while if an over drive is desired, in order to give greater road clearance, the casing 10 may be turned end for end relative to the units 12 and then swung 180° into the position shown in Fig. 3.

By removing cover 11 and caps 14′ the unit—consisting of the cage 17, the differential gearing and the driving worm and its shaft and bearings—may be bodily withdrawn from the casing 10 without disturbing the adjustment of any of the bearings and without disconnecting the torque tube from the casing member of the driving axle structure.

All of the bearings of the differential gearing, and the driving worm and shaft may be adjusted accurately with the cage 17—17 on a convenient bench and then the unit placed securely within the casing 10 without the necessity of any readjustment.

I claim as my invention:

1. A driving axle structure comprising a casing member, a cage detachably mounted in the casing and reversible therein end-for-end, said cage having a lateral extension lying substantially at right angles to the axis of the cage and casing, shaft bearings carried by said extension, a bearing shaft carried in said bearings, a compensator mounted in the cage, and meshing gears carried by and connecting said shaft and compensator.

2. A driving axle structure comprising a casing member, a cage detachably mounted in the casing, said cage having a lateral extension lying substantially at right angles to the axis of the cage and casing, shaft bearings carried by said extension, a bearing shaft carried in said bearings, a compensator mounted in the cage, and meshing gears carried by and connecting said shaft and compensator.

3. In a driving axle structure, the combination of a pair of opposite extending tubular casing members, shaft sections rotatably mounted in said tubular casing members, a central casing member formed at its ends for detachable engagement with either of the tubular members, said central casing member having a transverse perforation to one side of the axis of the casing, a cage detachably mounted in the central casing member and having a lateral extension arranged in alinement with said transverse perforation, said cage being reversible end-for-end in the casing, shaft bearings carried by the lateral extension of the cage, a driving shaft carried in said bearings, a compensator mounted in the cage, and gears carried by and connecting the driving shaft and compensator.

4. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation to one side of the axis of the casing, a cage detachably mounted in the central casing member and having a lateral extension arranged in alinement with said transverse perforation, shaft bearings carried by the lateral extension of the cage, a driving shaft carried in said bearings, a compensator mounted in the cage, and gears carried by and connecting the driving shaft and compensator.

5. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation to one side of the axis of the casing, a cage detachably mounted in the central casing member and having a lateral extension arranged in alinement with said transverse perforation, said cage being reversible end-for-end in the casing, shaft bearings carried by the lateral extension of the cage, a driving shaft carried in said bearings, a compensator mounted in the cage, gears carried by and connecting the driving shaft and compensator, a torque tube connected to the central casing member around its transverse perforation, a shaft mounted therein, and an axially separable driving connection between said shaft and the driving shaft carried by the cage.

6. In a driving axle structure, the combination of a pair of oppositely extending tubular casing members, shaft sections rotatably mounted in said tubular casing members, a central casing member formed at its ends for detachable engagement with either of the tubular members, said central casing member having a transverse perforation to one side of the axis of the casing, a cage detachably mounted in the central casing member and having a lateral extension arranged in alinement with said transverse perforation, shaft bearings carried by the lateral extension of the cage, a driving shaft carried in said bearings, a compensator mounted in the cage, gears carried by and connecting the driving shaft and compensator, a torque tube connected to the central casing member around its transverse perforation, a shaft mounted therein, and an axially separable driving connection between said shaft and the driving shaft carried by the cage.

In witness whereof, I have hereunto set my hand and seal at Indianapolis, Indiana, this 16th day of March, A. D. one thousand nine hundred and twelve.

THOMAS J. LINDSAY. [L. S.]

Witnesses:
ARTHUR M. HOOD,
FRANK A. FAHLE.